(12) United States Patent
Euse (10) Patent No.: US 8,978,589 B2
(45) Date of Patent: Mar. 17, 2015

(54) HABITAT WITH FRAMED ENCLOSURE AND BASIN

(76) Inventor: Peter F. Euse, Bonita Springs, FL (US)

(*) Notice: Subject to any disclaimer, the term of this patent is extended or adjusted under 35 U.S.C. 154(b) by 431 days.

(21) Appl. No.: 13/428,292

(22) Filed: Mar. 23, 2012

(65) Prior Publication Data

US 2012/0180733 A1    Jul. 19, 2012

Related U.S. Application Data

(63) Continuation-in-part of application No. 12/777,361, filed on May 11, 2010, now Pat. No. 8,191,510.

(51) Int. Cl.
- *A01K 31/06* (2006.01)
- *A01K 31/04* (2006.01)
- *A01K 31/07* (2006.01)

(52) U.S. Cl.
CPC ............... *A01K 31/04* (2013.01); *A01K 31/06* (2013.01); *A01K 31/07* (2013.01)
USPC ............ 119/460; 119/462; 119/463; 119/459

(58) Field of Classification Search
USPC .................................. 119/462, 460, 463, 459
See application file for complete search history.

(56) References Cited

U.S. PATENT DOCUMENTS

| | | |
|---|---|---|
| 689,064 A | 12/1901 | Castle |
| 1,468,730 A | 9/1923 | Oster |
| 1,502,748 A | 7/1924 | Schleich |
| 1,692,835 A | 11/1928 | Hendryx |
| 1,771,491 A | 7/1930 | Hendryx |
| 1,864,230 A | 6/1932 | Busch |
| 1,929,584 A | 10/1933 | Havlis |
| 2,524,229 A | 10/1950 | Krueger |
| 2,747,545 A | 5/1956 | Baldwin |
| 3,293,664 A | 12/1966 | Woodrow |
| 3,297,001 A | 1/1967 | Locke et al. |
| 3,657,746 A | 4/1972 | Downey |
| 4,181,612 A | 1/1980 | Trail |
| 4,285,301 A | 8/1981 | Voss |
| 4,413,363 A | 11/1983 | Troiano |
| 4,572,107 A | 2/1986 | Clarizo |
| 4,586,463 A | 5/1986 | Braeuner |
| 4,838,204 A | 6/1989 | Young |
| 5,009,197 A | 4/1991 | Cottell |

(Continued)

FOREIGN PATENT DOCUMENTS

| | | |
|---|---|---|
| DE | 19747311 | 9/2002 |
| FR | 2766330 | 1/1999 |

(Continued)

*Primary Examiner* — Kristen C Hayes
(74) *Attorney, Agent, or Firm* — Livingston Loeffler, P.A.; Edward M. Livingston, Esq.; Bryan L. Loeffler, Esq.

(57) ABSTRACT

A habitat (1) having a framed enclosure (2) with removable panels (25), preferably constructed out of a screen material and a basin (3) that collects waste, such as bird food and feces, and is use to collect and dispose of water when cleaning the habitat or to drain water if the habitat is being used for gardening. A removable perch (18) and carrying bag (21) allows a user a way to easily transport an animal from location to location. A cleaning perch (21) attaches to the top of the frame and provides a location for an animal to rest while the habitat is being cleaned. The cleaning perch also provides a ring (22) for attaching a shower curtain (23) that surrounds the habitat while it is being cleaned. One of many alternative uses for the habitat is as a portable garden.

20 Claims, 5 Drawing Sheets

(56) References Cited

U.S. PATENT DOCUMENTS

| | | | |
|---|---|---|---|
| 5,305,708 A * | 4/1994 | Keisler, Jr. | 119/462 |
| 5,435,266 A | 7/1995 | Carson | |
| 5,553,568 A | 9/1996 | Verschuere et al. | |
| 5,957,086 A * | 9/1999 | Gallardo | 119/429 |
| 5,996,536 A | 12/1999 | King | |
| 6,129,052 A * | 10/2000 | Huang | 119/461 |
| 6,532,900 B1 | 3/2003 | Wang | |
| 6,626,129 B2 | 9/2003 | Schrader | |
| 7,827,939 B2 * | 11/2010 | Yang | 119/461 |
| D641,455 S | 7/2011 | Euse | |
| 8,191,510 B2 * | 6/2012 | Euse | 119/467 |
| 2004/0031446 A1 | 2/2004 | Harrison | |

FOREIGN PATENT DOCUMENTS

| | | |
|---|---|---|
| GB | 2079576 | 1/1982 |
| JP | 4135431 | 5/1992 |
| JP | 2003230327 | 8/2003 |
| KR | 20050011637 | 1/2005 |

\* cited by examiner

HABITAT WITH FRAMED ENCLOSURE AND BASIN

CROSS REFERENCE TO RELATED APPLICATION

This is a continuation-in-part application of Ser. No. 12/777,361 filed on May 11, 2010. now U.S. Pat. No. 8,191,510. The patent application identified above is incorporated herein by reference in its entirety to provide continuity of disclosure.

FIELD OF THE INVENTION

This invention relates to habitats for pets, such as bird, reptiles, cats and so forth and more particularly, a habitat having a framed enclosure with removable panels and a basin for the purpose of collecting and disposing of waste, such as bird food and feces, and for use in cleaning the habitat. This invention also relates to gardening and more particularly portable gardens.

BACKGROUND OF THE INVENTION

A well known problem with owning and caring for domesticated birds and other animals is the maintenance and convenience of use. For example, most birds are typically messy when eating and have a tendency to drop food and other matter, including feces, on the bottom of the bird cage, on the sides of the bird cage, on top of the bird cage while on a perch and even outside of the bird cage onto the floor surrounding the bird cage. This creates quite a mess on the bars of the bird cage and especially in the bottom of the bird cage where waste accumulates and must be cleaned on a regular basis. Bird owners typically place absorbent material, such as newspaper, wood shavings or corn cob in the bottom portion of the bird cage to collect feces and water spilled from the bird's water dish. However, the absorbent material must be replaced on a regular basis and the bird cages must also be sprayed down and washed on a regular basis. Bird cages cannot be sprayed down inside and typically need to be taken outside and to be washed down with a hose. This poses a problem for bird owners who live in condos or apartments and cannot take the bird cages outside for cleaning. This also poses a problem for bird owners who own large cages that are difficult to move. Cages that are difficult to move also prevent a pet owner from being able to move a pet from one location to another, such as from inside of a house onto a patio. An even further problem with conventional cages is that owners are limited in where they can place the cages for fear that an animal may be exposed to heat or sunlight. For example, an owner may want to place a bird cage on a patio during the day, but the heat and exposure to sunlight through the bars of the cage prevents the owner from doing so.

Thus, a need exists for a habitat that replaces conventional bird cages and allows a user to easily maintain and clean the habitat, to easily move the habitat from location to location, and protects animals from the elements when it is placed outdoors.

An additional problem faced by gardeners is the placement of small gardens, such as herb gardens. Many such gardens create a mess on the surface below the pots and are difficult to move for the purposes of placing the garden in direct sunlight or moving the garden out of extreme weather conditions.

Thus, a need exists for providing a habitat that can be used as a portable garden.

The relevant prior art includes the following references:

| Pat. No. | Inventor | Issue/Publication Date |
| --- | --- | --- |
| (U.S. References) | | |
| D641,455 | Euse | Jul. 12, 2011 |
| 2004/0031446 | Harrison | Feb. 19, 2004 |
| 6,626,129 | Schrader | Sep. 30, 2003 |
| 6,532,900 | Wang | Mar. 18, 2003 |
| 5,996,536 | King | Dec. 07, 1999 |
| 5,957,086 | Gallardo | Sep. 28, 1999 |
| 5,553,568 | Verscheure et al. | Sep. 10, 1996 |
| 5,435,266 | Carson | Jul. 25, 1995 |
| 5,009,197 | Cottell | Apr. 23, 1991 |
| 4,838,204 | Young | Jun. 13, 1989 |
| 4,586,463 | Braeuner | May 06, 1986 |
| 4,572,107 | Clarizo | Feb. 25, 1986 |
| 4,413,363 | Troiano | Nov. 08, 1983 |
| 4,285,301 | Voss | Aug. 25, 1981 |
| 4,181,612 | Trail | Jan. 01, 1980 |
| 3,657,746 | Downey | Apr. 25, 1972 |
| 3,297,001 | Locke et al. | Jan. 10, 1967 |
| 3,293,664 | Woodrow | Dec. 27, 1966 |
| 2,747,545 | Baldwin | May 29, 1956 |
| 2,524,229 | Krueger | Oct. 03, 1950 |
| 1,864,230 | Busch | Jun. 21, 1932 |
| 1,929,584 | Havlis | Oct. 10, 1933 |
| 1,771,491 | Hendryx | Jul. 29, 1930 |
| 1,692,835 | Hendryx | Nov. 27, 1928 |
| 1,502,748 | Schleich | Jul. 29, 1924 |
| 1,468,730 | Oster | Sep. 25, 1923 |
| 689,164 | Castle | Dec. 17, 1901 |
| (Foreign References) | | |
| KR20050011637 | Young | Jan. 29, 2005 |
| JP2003230327 | Miwako | Aug. 19, 2003 |
| DE19747311 | Hartmut | Sep. 05, 2002 |
| FR2766330 | Herve | Jan. 29, 1999 |
| JP4135431 | Takuji | May 08, 1992 |
| GB2079576 | Ayres | Jan. 27, 1982 |

SUMMARY OF THE INVENTION

The primary objects of the present invention are to provide a habitat that replaces conventional bird cages.

Another object of the present invention is to provide a habitat having a basin that allows a user to easily maintain and clean the habitat.

to easily move the habitat from location to location, and protects animals from the elements when it is placed outdoors.

A further object of the present invention is to provide a habitat that easily moveable the habitat from location to location.

Another object of the present invention is to provide a habitat that protects animals from the elements when it is placed outdoors.

A further object of the present invention is to provide a habitat that has removable and interchangeable panels that easily attach to a framed enclosure.

Another object of the present invention is to provide a habitat having a perch that is easily accessorize.

A further object of the present invention is to provide a habitat having a removable perch that can be converted into a travel habitat for transporting an animal.

Another object of the present invention is to provide a habitat having a perch that allows a user to attach a shower curtain to the habitat so the habitat may be cleaned with little mess.

A further object of the present invention is to provide a habitat that can be used for gardening.

The present invention fulfills the above and other objects by providing a habitat having a framed enclosure with removable panels, preferably constructed out of a screen material.

The frame may be placed over a basin that collects waste, such as bird food and feces, and is use to collect and dispose of water when cleaning the habitat. A removable perch and carrying bag allows a user a way to easily transport an animal from location to location. A cleaning perch attaches to the top of the frame and provides a location for an animal to rest while the habitat is being cleaned. The cleaning perch also provides a ring for attaching a shower curtain that surrounds the habitat while it is being cleaned.

One of many alternative uses for the habitat is as a garden. For example, a user may plant an herb garden in the directly in the basin or in pots that are placed in the basin. The habitat may be rolled in and out of the sunlight or inside or outdoors to protect the plants from extreme temperatures. Panels may also be removed or attached to the enclosure to protect the plants or to expose the plants to sunlight.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figures 1, 2:
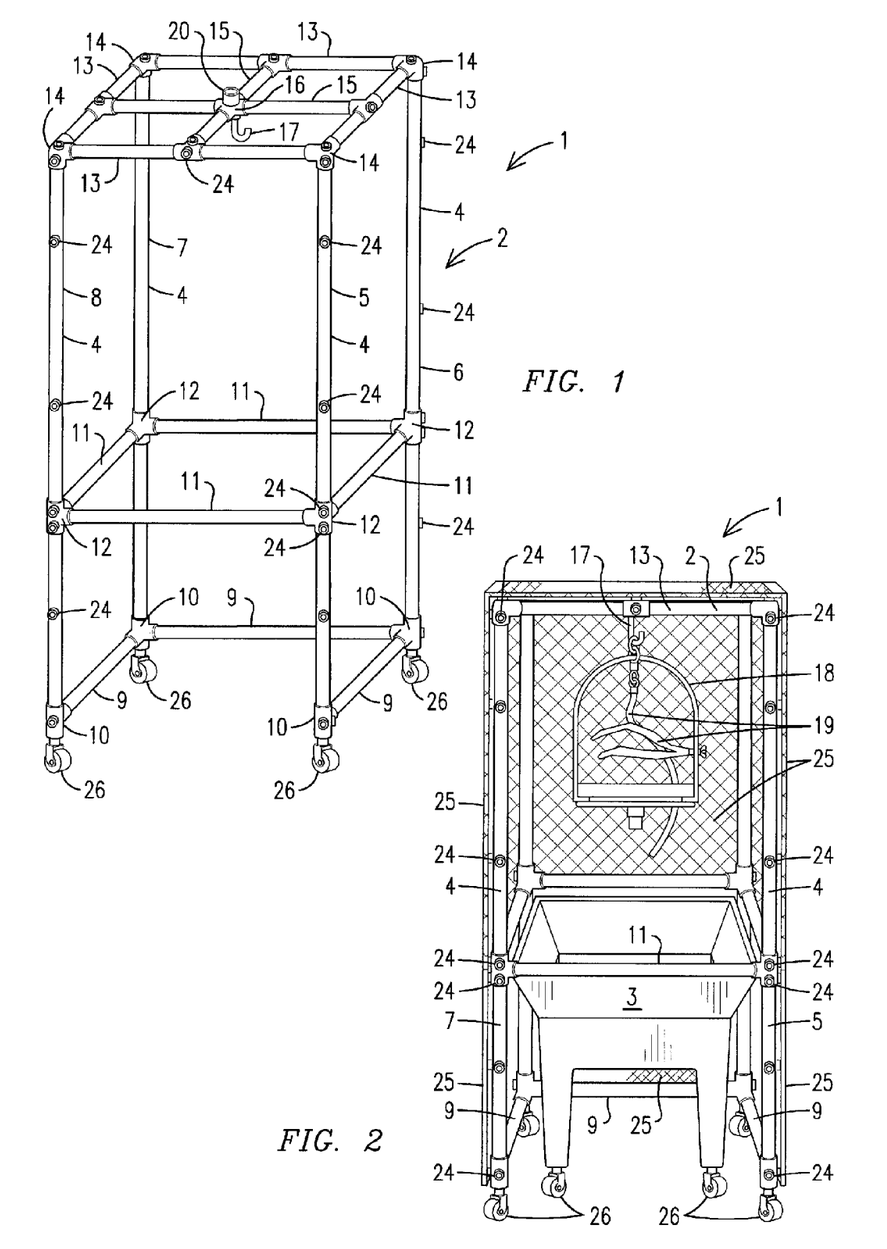
FIG. 1 is a perspective front view of a habitat frame of the present invention that surrounds a basin.
FIG. 2 is a front view of a habitat of the present invention having a basin located therein and panels attached.
Figures 11, 12:
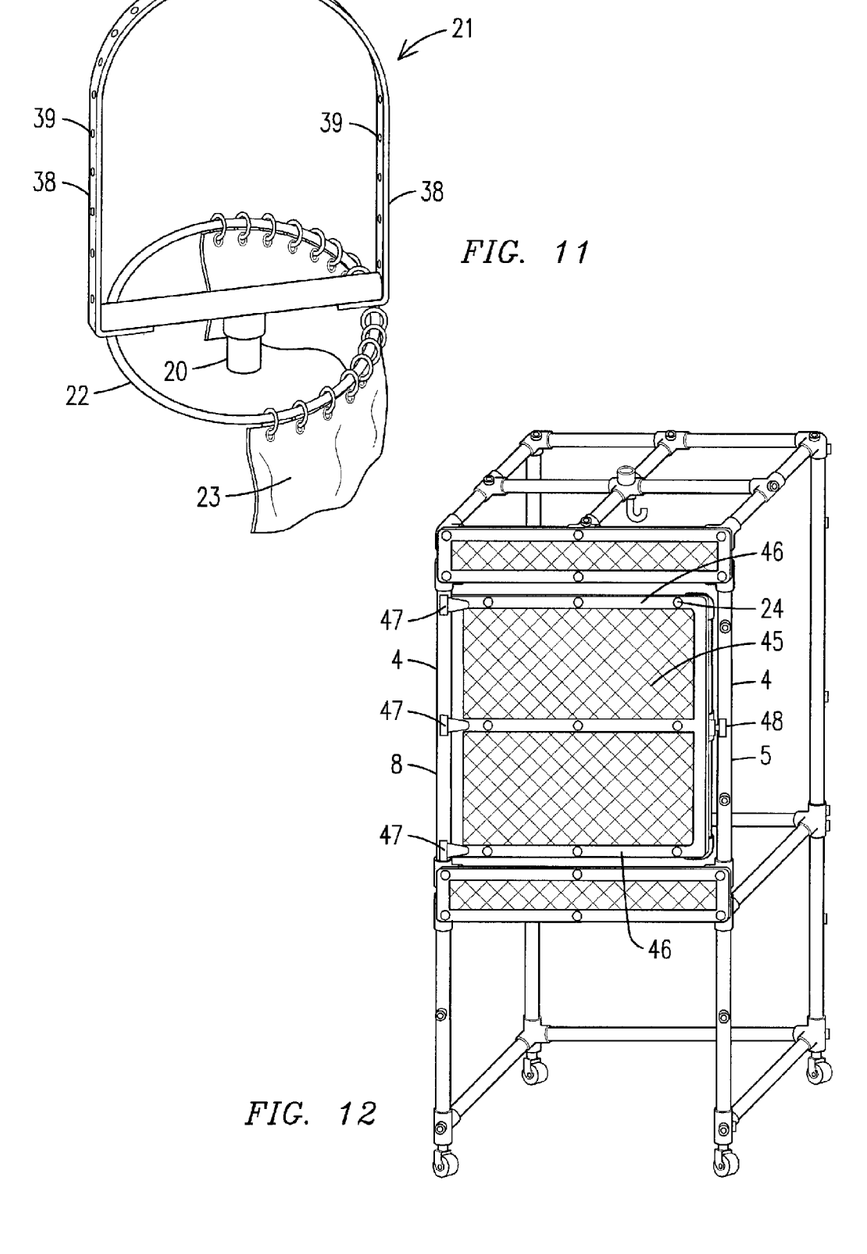
FIG. 11 is a perspective side view of a cleaning perch of the present invention.
FIG. 12 is a front perspective view of a frame of the present invention having a door for accessing the interior of the frame without having to remove any panels from the frame.

For purposes of describing the preferred embodiment, the terminology used in reference to the numbered components in the drawings is as follows:

1. habitat
2. frame
3. basin
4. vertical support
5. front right vertical support
6. rear right vertical support
7. rear left vertical support
8. front left vertical support
9. bottom horizontal support
10. bottom end of vertical support
11. middle horizontal support
12. middle portion of vertical support
13. top horizontal support
14. top end of vertical support
15. upper cross bar
16. intersection
17. accessory attachment means
18. perch
19. rope
20. upper attachment means
21. cleaning perch
22. ring
23. curtain
24. panel attachment means
25. panel
26. wheel
27. removable floor
28. notched corner
29. side of removable floor
30. leg
31. tub
32. floor of tub
33. vertical perimeter wall of tub
34. angled perimeter wall of tub
35. upper edge of vertical perimeter wall of tub
36. drain
37. removable floor
38. arch
39. aperture
40. L-shaped bracket
41. carrying bag
42. carrying bag attachment means
43. handle
44. cross member
45. door
46. horizontal door frame support
47. hinge
48. locking means With reference to FIG. 1, a perspective front view of a habitat 1 frame 2 of the present invention that surrounds a basin 3 is illustrated. The habitat 1 comprises a frame 2 having at least four vertical supports 4, preferably a front right vertical support 5, a rear right vertical support 6, a rear left vertical support 7 and a front left vertical support 8. Bottom horizontal supports 9 connect bottom ends 10 of the vertical supports 4 and extend between the front right vertical support 5 and the rear right vertical support 6, between the rear right vertical support 6 and the rear left vertical support 7, and between the rear left vertical support 7 and the front left vertical support 8. Middle horizontal supports 11 connect middle portions 12 of the vertical supports 4 and extend between the front right vertical support 5 and the rear right vertical support 6, between the rear right vertical support 6 and the rear left vertical support 7, between the rear left vertical support 8 and the front left vertical support 8 and between the front left vertical support 8 and the front right vertical support 5. Top horizontal supports 13 connect top ends 14 of the vertical supports 4 and extend between the front right vertical support 5 and the rear right vertical support 6, between the rear right vertical support 6 and the rear left vertical support 7, between the rear left vertical support 7 and the front left vertical support 8 and between the front left vertical support 8 and the front right vertical support 5. Upper cross bars 15 connect the top horizontal supports 13 and form an intersection 16 in the center of the habitat 1. A perch attachment means 17, such as a hook, eyelet, loop, bolt, clip and so forth, extends down from the intersection 16. The perch attachment means 17 provides a means to attach and hang a perch 18. Accessories 19 may then be attached to the perch, as illustrated in FIG. 2. An upper attachment means 20, such as a pipe fitting, sleeve and so forth, extends upward from the intersection 16. The upper attachment means 20 provides a means for attaching a cleaning perch 21, as illustrated in FIG. 11, preferably having a ring 22 for attaching a curtain 23. Panel attachment means 24, such as snaps, buttons, clips, hook and loop fastener and so forth, are located on the vertical supports 4, bottom horizontal supports 9, middle horizontal supports 11 and top horizontal supports 13 to allow a user to attach one or more panels 25 to the vertical supports 4, bottom horizontal supports 9, middle horizontal supports 11 and/or top horizontal supports 13 to enclose the habitat 1. Wheels 26 are preferably located on the bottom ends 10 of the vertical supports 4 to allow a user to easily move the habitat 1 from location to location. An accessory attachment means 17, such as a hook, eyelet, loop and so forth, extends down from the intersection 16. The accessory attachment means 17 provides a means to attach and hang accessories, such as a perch 18, rope 19 and so forth, in the habitat 1.

Figure 3:
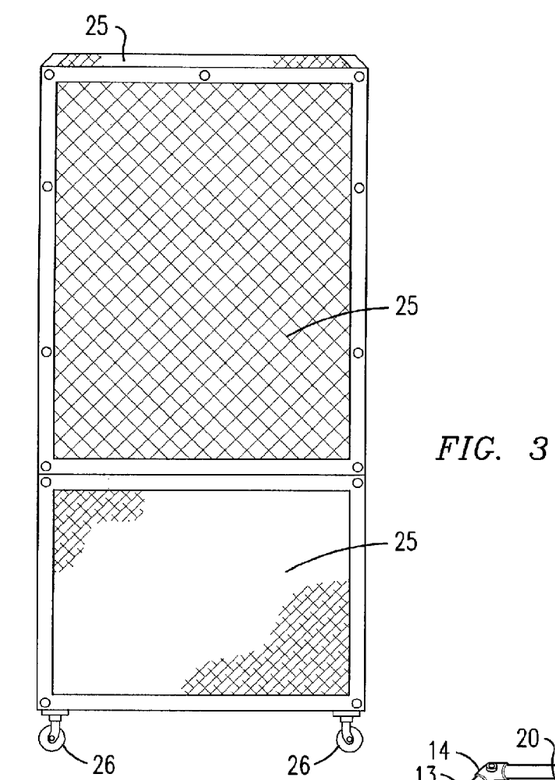
FIG. 3 is a representative view of a right side view, rear side view and left side view of the habitat.

With reference to FIGS. 2 and 3, a front view of a habitat 1 of the present invention having a basin 3 located therein and panels 25 attached and a representative view of a right side view, rear side view and left side view of the habitat 1 illustrated in FIG. 2, respectively, are illustrated. The basin 3 has wheels 26 to allow a user to roll the basin 3 into the frame 2 between the front right vertical support 4 and the front left vertical support 7 and then be rolled with the frame 2 from location to location. Panel attachment means 24, such as snaps, buttons, clips, hook and loop fastener and so forth, are located on the vertical supports 4, bottom horizontal supports 9, middle horizontal supports 11 and top horizontal supports 13 to allow a user to attach one or more panels 25 having panel attachment means 24 located thereon to the vertical supports 4, bottom horizontal supports 9, middle horizontal supports 11 and/or top horizontal supports 13 to enclose the habitat 1. As illustrated in FIG. 2, the area between the front right vertical support 4 and the front left vertical support 7 does not have a panel attached thereto. The panels 25 may be constructed out of various materials, such as screen, cloth, 80/20 fabric, plastic, Plexiglas and so forth, and are interchangeable depending on the location a user places the habitat 1 or the type of animal being placed in the habitat 1.

Figure 4:
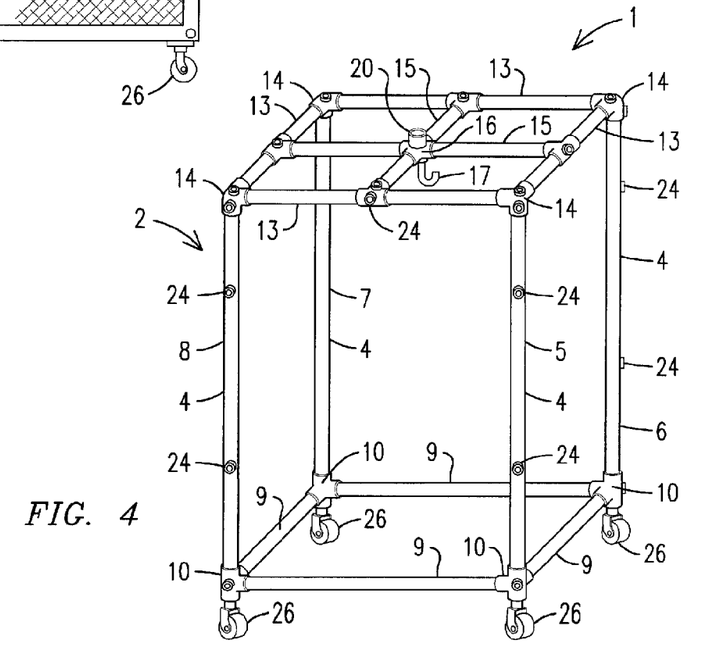
FIG. 4 is a perspective front view of a habitat frame of the present invention that fits into a basin.

With reference to FIG. 4, a perspective front view of a habitat 1 frame 2 of the present invention that fits into a basin 3 is illustrated. The habitat comprises a frame 2 having at least four vertical supports 4, preferably a front right vertical support 5, a rear right vertical support 6, a rear left vertical support 7 and a front left vertical support 8. Bottom horizontal supports 9 connect bottom ends 10 of the vertical supports 4 and extend between the front right vertical support 5 and the'rear right vertical support 6, between the rear right vertical support 6 and the rear left vertical support 7, between the rear left vertical support 7 and the front left vertical support 8, and between the front left vertical support 8 and the front right vertical support 5. Top horizontal supports 13 connect top ends 14 of the vertical supports 4 and extend between the front right vertical support 5 and the rear right vertical support 6, between the rear right vertical support 6 and the rear left vertical support 7, between the rear left vertical support 7 and the front left vertical support 8 and between the front left vertical support 8 and the front right vertical support 5. Upper cross bars 15 connect the top horizontal supports 13 and form an intersection 16 in the center of the habitat 1. An accessory attachment means 17, such as a hook, eyelet, loop, bolt, clip and so forth, extends down from the intersection 16. The accessory attachment means 17 provides a means to attach and hang accessories, such as a perch 18, rope 19 and so forth, in the habitat 1, as illustrated in FIG. 2. An upper attachment means 20, such as a pipe fitting, sleeve and so forth, extends upward from the intersection 16. The upper attachment means 20 provides a means for attaching a cleaning perch 21, as illustrated in FIG. 11, preferably having a ring 22 for attaching a curtain 23. Panel attachment means 24, such as snaps, buttons, clips, hook and loop fastener and so forth, are located on the vertical supports 4, bottom horizontal supports 9, middle horizontal supports 11 and top horizontal supports 13 to allow a user to attach one or more panels 25 to the vertical supports 4, bottom horizontal supports 9 and/or top horizontal supports 13 to enclose the habitat 1. Wheels 26 are preferably located on the bottom ends 10 of the vertical supports 4 to allow a user to easily move the habitat 1 from location to location. An accessory attachment means 17, such as a hook, eyelet, loop and so forth, extends down from the intersection 16. The accessory attachment means 17 provides a means to attach and hang accessories, such as a perch 18, rope 19 and so forth, in the habitat 1.

Figure 5:
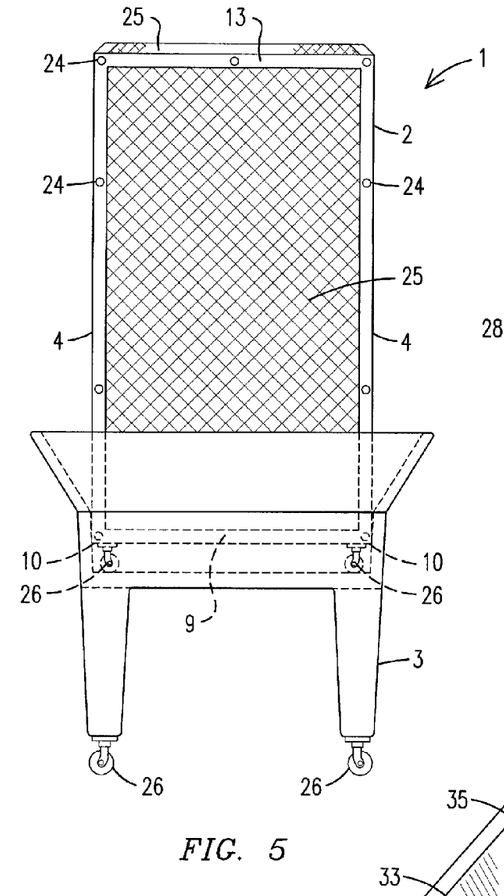
FIG. 5 is a side view of a habitat frame of the present invention with a basin base.

With reference to FIG. 5, a side view of a habitat 1 frame 2 of the present invention with a basin 3 base is illustrated. The bottom horizontal supports 9 and bottom ends 10 of the vertical supports 4 fit within the basin 3. The basin 3 has wheels 26 to allow a user to roll the basin 3 and the frame 2 from location to location. Panel attachment means 24, such as snaps, buttons, clips, hook and loop fastener and so forth, are located on the vertical supports 4, bottom horizontal supports 9, middle horizontal supports 11 and top horizontal supports 13 to allow a user to attach one or more panels 25 having panel attachment means 24 located thereon to the vertical supports 4, bottom horizontal supports 9 and/or top horizontal supports 13 to enclose the habitat 1.

Figure 6:
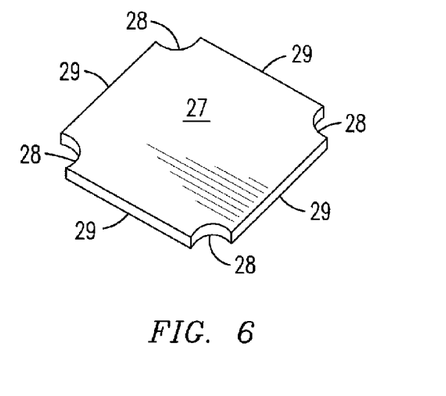
FIG. 6 is a side plan view of a lower cleaning sink of a bird cage assembly of the present invention is shown having no base.

With reference to FIG. 6, a perspective top view of a removable floor 27 of the present invention is illustrated. The removable floor 27 substantially rectangular-shaped and has notched corners 28. When the removable floor is placed in the frame 2, the sides 29 of the removable floor 27 rest on top of the bottom horizontal supports 9 and the notched corners 28 engage the vertical supports 4, thereby preventing the removable floor 27 from sliding out of the frame 2. The removable floor 27 is preferably placed in the frame 2 illustrated in FIG. 4 when the frame 2 is not in the basin 3, as illustrated in FIG. 5.

Figure 7:
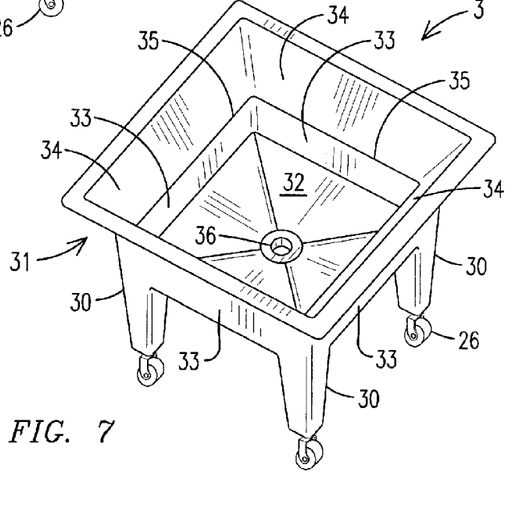
FIG. 7 is a perspective top view of a basin of the present invention.

With reference to FIG. 7, a perspective top view of a basin 3 of the present invention is illustrated. The basin 3 comprises legs 30 having wheels 26 located thereon for rolling the basin 3 from location to location. The legs 30 support a tub 31 comprising a floor 32, a vertical perimeter wall 33 and an angled perimeter wall 34 extending from an upper edge 35 of the vertical perimeter wall 33. A drain 36 is located in the floor 32 of the tub 31. The drain 36 may be threaded so it can be attached to plumbing. When the frame 2 is placed in the basin 3 the vertical perimeter wall 33 keeps the frame 2 in a stable position. When the frame 2 is placed in the basin 3 the removable floor 27 is preferably removed so waste will fall directly onto the floor 32 of the tub 31.

Figures 8, 9, 10:
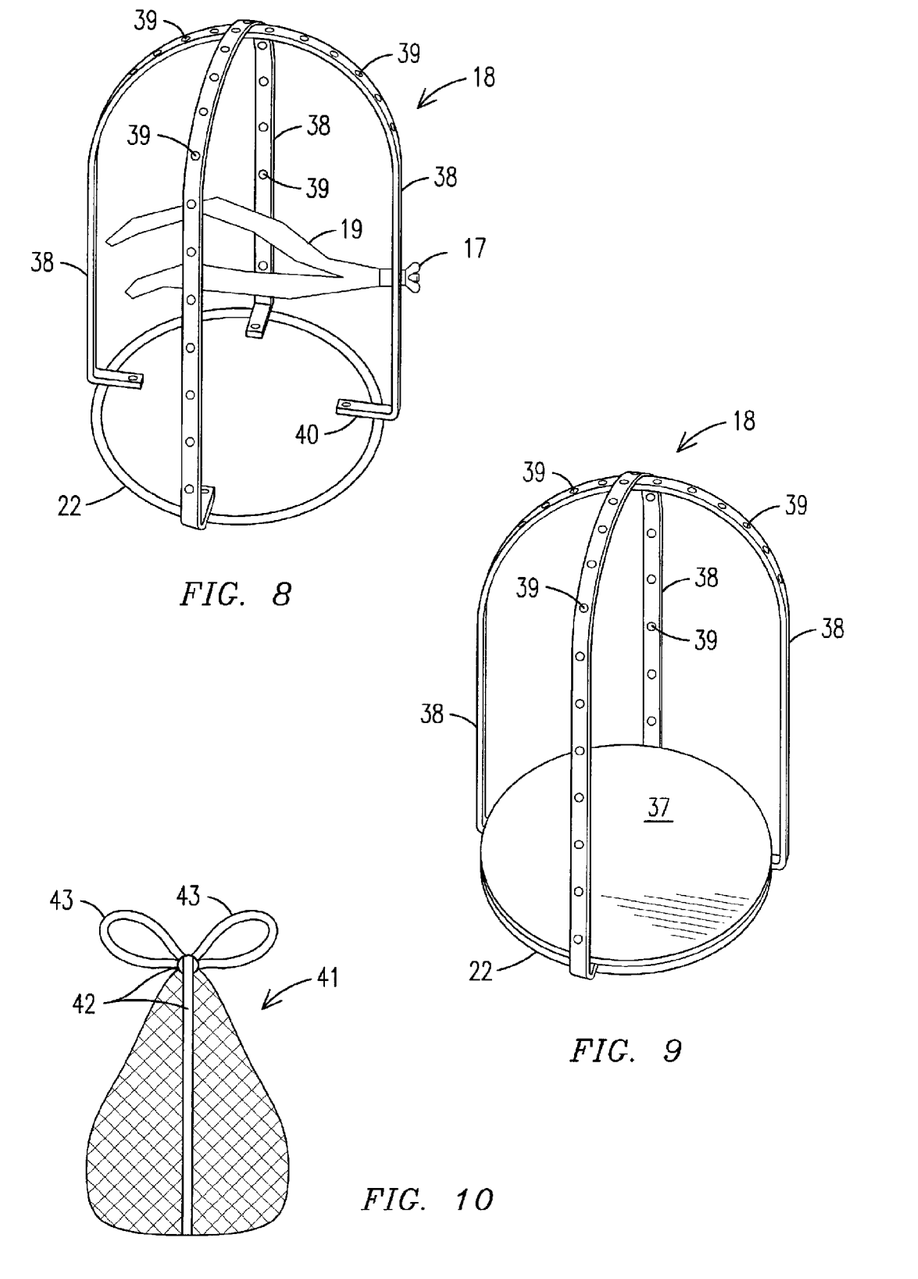
FIG. 8 is a perspective side view of a perch of the present invention.
FIG. 9 is a perspective side view of a perch of the present invention having a removable floor.
FIG. 10 is a side view of a carrying bag of the present invention.

With reference to FIGS. 8 and 9, a perspective side view of a perch 18 of the present invention and a perspective side view of a perch 18 of the present invention having a removable floor 37, respectively, are illustrated. The perch comprises a ring 22 having at least one arch 38 extending upward from and curving across the span of the ring 22 downward to the opposite side of the ring 22. Each arch 38 preferably has a plurality of apertures 39 to allow a user to attach accessories 19, such as toys, limbs, ropes and so forth (as illustrated in FIGS. 2 and 8), to an arch 38 via an accessory attachment means 40, such as a nut and bolt. Substantially L-shaped brackets 40 extend from the ends of the arches 38 and provides support for a removable floor 37. The removable floor 37 may be used in conjunction with the carrying bag 41 illustrated in FIG. 10 to allow a user to transport an animal in the perch 18.

With reference to FIG. 10, a side view of a carrying bag 41 of the present invention is illustrated. A user may remove the perch illustrated in FIGS. 8 and 9 from a habitat 1 and place the perch 18 in the carrying bag 41, which is preferably made of a screen material, to create a means of transporting an animal from one location to another. A carrying bag attachment means 42, such as a hook and loop fastener, allows a user to seal the perch 18 within the carrying bag 41. Handles 43 provide a means for carrying the carrying bag 41 and perch 18.

With reference to FIG. 11, a perspective side view of a cleaning perch 21 of the present invention is illustrated. The cleaning perch 21 comprises a ring 22 having at least one arch 38 extending upward from and curving across the span of the ring 22 downward to the opposite side of the ring 22. The arch 38 preferably has a plurality of apertures 39 to allow a user to attach accessories 19, such as toys, limbs, ropes and so forth (as illustrated in FIGS. 2 and 8), to the arch 38 via an accessory attachment means 40, such as a nut and bolt. An upper attachment means 20, such as a pipe fitting, sleeve and so forth, extends downward from a cross member 44 that spans the diameter of the ring. The upper attachment means 20 provides a means for attaching a cleaning perch 21 to a frame 2 of the present invention to allow a space for an animal to rest while the habitat 1 is being cleaned. A user may attach a conventional shower curtain 23 to the ring 22 and enclose the habitat 1 during cleaning so water does not escape on surrounding areas while the habitat 1 is being sprayed. The cleaning perch 21 may also only comprise a ring 22 if an owner is not using the habitat 1 for a bird and is instead using the habitat to house another animal or as a utility sink or dog bath.

Finally with reference to FIG. 12, a front perspective view of a frame 2 of the present invention having a door 45 for accessing the interior of the frame 2 without having to remove any panels 25 from the frame 2 is illustrated. Horizontal door frame supports, 46 are located between the front right vertical support 5 and the front left vertical support 8 to create a door frame. The door 45 is attached to the left vertical support 8 via one or more hinges 47. A locking means 48, such as a latch, door knob and so forth, allows a user to secure the door 45 in a closed position. Panel attachment means 17 are located on the door 45 to allow a user to attach a panel 25 to the door 45.

It is to be understood that while a preferred embodiment of the invention is illustrated, it is not to be limited to the specific form or arrangement of parts herein described and shown. Although the embodiment shown here has a square shape, then invention may be any shape, such as circular, hexagonal, etc., to be adapted to any shape of bird cage. It will be apparent to those skilled in the art that various changes may be made without departing from the scope of the invention and the invention is not be considered limited to what is shown and described in the specification and drawings.

Having thus described my invention, I claim:

1. A habitat with a framed enclosure and basin comprising:
   a frame having at least three vertical supports;
   at least two bottom horizontal supports extending between the at least three vertical supports;
   at least three top horizontal supports extending between the at least three vertical supports;
   a basin having a tub, a drain located within the tub and at least three legs located in a position that is inferior to the top horizontal supports; and
   at least one panel attachment mean located on the frame for attaching at least one panel to the frame.

2. The habitat with a framed enclosure and basin of claim 1 wherein said frame further comprises:
   said at least three vertical supports comprise at least four vertical supports comprising a front right vertical support, a rear right vertical support, a rear left vertical support and a front left vertical support;
   said at least three bottom horizontal supports comprise a bottom horizontal support extending between the front right vertical support and the rear right vertical support;
   said at least three bottom horizontal supports comprise a bottom horizontal support extending between the rear right vertical support and the rear left vertical support;
   said at least three bottom horizontal supports comprise a bottom horizontal support extending between the between the rear left vertical support and the front left vertical support;
   said at least three top horizontal supports comprise a top horizontal support extending between the front right vertical support and the rear right vertical support;
   said at least three top horizontal supports comprise a top horizontal support extending between the rear right vertical support and the rear left vertical support;
   said at least three top horizontal supports comprise a top horizontal support extending between the rear left vertical support and the front left vertical support; and
   said at least three top horizontal supports comprise a top horizontal support extending between the front left vertical support and the front right vertical support.

3. The habitat with a framed enclosure and basin of claim 2 further comprising:
   a middle horizontal support extending between the front right vertical support and the rear right vertical support;
   a middle horizontal support extending between the rear right vertical support and the rear left vertical support;
   a middle horizontal support extending between the rear left vertical support and the front left vertical support; and
   a middle horizontal support extending between the front left vertical support and the front right vertical support.

4. The habitat with a framed enclosure and basin of claim 2 further comprising:
   said at least three bottom horizontal supports comprise a bottom horizontal support extending between and between the front left vertical support and the front right vertical support.

5. The habitat with a framed enclosure and basin of claim 1 further comprising:
   at least three middle horizontal supports extending between the at least three vertical supports.

6. The habitat with a framed enclosure and basin of claim 1 further comprising:
   at least one upper cross bar connected to at least two of the at least three top horizontal supports.

7. The habitat with a framed enclosure and basin of claim 6 further comprising:
   a perch attachment means extending down from the at least one upper cross bar.

8. The habitat with a framed enclosure and basin of claim 7 further comprising:
   a perch having a ring and at least one arch extending upward from and curving across the span of the ring downward to the opposite side of the ring.

9. The habitat with a framed enclosure and basin of claim 8 further comprising:
   at least one aperture located on the at least one arch.

10. The habitat with a framed enclosure and basin of claim 8 further comprising:
    substantially L-shaped brackets extending from ends of the at least one arch; and
    a removable floor that is supported by the substantially L-shaped brackets.

11. The habitat with a framed enclosure and basin of claim 8 further comprising:
    a carrying bag into which the perch may be placed and transported.

12. The habitat with a framed enclosure and basin of claim 6 further comprising:
    an upper attachment means extending down from the at least one upper cross bar for attaching a cleaning perch.

13. The habitat with a framed enclosure and basin of claim 12 wherein:
    said cleaning perch further comprises a ring and at least one arch extending upward from and curving across the span of the ring downward to the opposite side of the ring; and
    a cross member that spans the diameter of the ring.

14. The habitat with a framed enclosure and basin of claim 13 further comprising:
    a shower curtain that is removeably attachable to the ring of the cleaning perch.

15. The habitat with a framed enclosure and basin of claim 1 further comprising:
    wheels located on bottom ends of the at least three vertical supports of the frame.

16. The habitat with a framed enclosure and basin of claim 1 further comprising:
    wheels located on bottom ends of the at least three legs of the basin.

17. The habitat with a framed enclosure and basin of claim 16 wherein:
    the removable floor has notched corners that correspond to the shape of the at least for vertical supports.

18. The habitat with a framed enclosure and basin of claim 1 wherein:
    the tub of the basin further comprises has a vertical perimeter wall extending upward from a perimeter of a floor; and
    an angled perimeter wall extending upward from an upper edge of the vertical perimeter wall.

19. The habitat with a framed enclosure and basin of claim 1 further comprising:
    a removable floor that rests on the bottom horizontal supports.

20. The habitat with a framed enclosure and basin of claim 1 further comprising:
    a door attached to one of the at least three vertical supports by at least one hinge.

* * * * *